(12) United States Patent
Kumar et al.

(10) Patent No.: US 8,516,539 B2
(45) Date of Patent: Aug. 20, 2013

(54) SYSTEM AND METHOD FOR INFERRING ACCESS POLICIES FROM ACCESS EVENT RECORDS

(75) Inventors: Srinivas Kumar, Cupertino, CA (US); Dean A. Weber, Novelty, OH (US)

(73) Assignee: Citrix Systems, Inc, Fort Lauderdale, FL (US)

( * ) Notice: Subject to any disclaimer, the term of this patent is extended or adjusted under 35 U.S.C. 154(b) by 471 days.

(21) Appl. No.: 12/267,804

(22) Filed: Nov. 10, 2008

(65) Prior Publication Data

US 2009/0138939 A1    May 28, 2009

Related U.S. Application Data

(60) Provisional application No. 60/986,856, filed on Nov. 9, 2007.

(51) Int. Cl.
  *H04L 29/06* (2006.01)
(52) U.S. Cl.
  USPC ......... 726/1; 726/3; 726/11; 726/12; 713/153
(58) Field of Classification Search
  USPC .............................. 726/1, 3, 11, 12; 713/153
  See application file for complete search history.

(56) References Cited

U.S. PATENT DOCUMENTS

| | | | |
|---|---|---|---|
| 5,218,637 A | 6/1993 | Angebaud et al. | |
| 5,757,916 A | 5/1998 | MacDoran et al. | |
| 5,784,562 A | 7/1998 | Diener | |
| 5,867,494 A | 2/1999 | Krishnaswamy et al. | |
| 5,887,065 A | 3/1999 | Audebert | |
| 5,983,270 A | 11/1999 | Abraham et al. | |
| 5,987,611 A | 11/1999 | Freund | |
| 5,999,525 A | 12/1999 | Krishnaswamy et al. | |
| 6,021,495 A | 2/2000 | Jain et al. | |
| 6,070,245 A | 5/2000 | Murphy et al. | |
| 6,076,108 A | 6/2000 | Courts et al. | |
| 6,105,136 A | 8/2000 | Cromer et al. | |
| 6,141,758 A | 10/2000 | Benantar et al. | |
| 6,145,083 A | 11/2000 | Shaffer et al. | |
| 6,161,182 A | 12/2000 | Nadooshan | |
| 6,170,019 B1 | 1/2001 | Dresel et al. | |

(Continued)

FOREIGN PATENT DOCUMENTS

| | | |
|---|---|---|
| CA | 2286534 | 4/2001 |
| EP | 1 071 256 | 1/2001 |

(Continued)

OTHER PUBLICATIONS

Scarfone et al, Guide to Intrusion Detection and Prevention Systems (IDPS), Feb. 2007, NIST, Special Publication 800-94.*

(Continued)

*Primary Examiner* — Nathan Flynn
*Assistant Examiner* — Sarah Su
(74) *Attorney, Agent, or Firm* — Foley and Lardner LLP; Christopher J. McKenna (57) ABSTRACT

A method of security gateway policy definition to quickly infer a new policy based on event data extracted and analyzed using business logic and workflow from a gateway event log or behavior log. The method includes reading the components of a log record, translating the components into acceptable policy attributes, creating a new policy based on those attributes, and presenting the new policy to a system administrator for editing and approval.

24 Claims, 8 Drawing Sheets

(56) References Cited

U.S. PATENT DOCUMENTS

| | | |
|---|---|---|
| 6,199,113 B1 | 3/2001 | Alegre et al. |
| 6,219,669 B1 | 4/2001 | Haff et al. |
| 6,253,326 B1 | 6/2001 | Lincke et al. |
| 6,304,969 B1 | 10/2001 | Wasserman et al. |
| 6,335,927 B1 | 1/2002 | Elliott et al. |
| 6,345,291 B2 | 2/2002 | Murphy et al. |
| 6,393,569 B1 | 5/2002 | Orenshteyn |
| 6,418,472 B1 | 7/2002 | Mi et al. |
| 6,442,571 B1 | 8/2002 | Haff et al. |
| 6,452,915 B1 | 9/2002 | Jorgensen |
| 6,470,453 B1 | 10/2002 | Vilhuber |
| 6,473,794 B1 | 10/2002 | Guheen et al. |
| 6,480,967 B1 | 11/2002 | Jensen et al. |
| 6,502,192 B1 | 12/2002 | Nguyen |
| 6,510,350 B1 | 1/2003 | Steen et al. |
| 6,519,571 B1 | 2/2003 | Guheen et al. |
| 6,523,027 B1 | 2/2003 | Underwood |
| 6,535,917 B1 | 3/2003 | Zamanzadeh et al. |
| 6,536,037 B1 | 3/2003 | Guheen et al. |
| 6,594,589 B1 | 7/2003 | Coss et al. |
| 6,601,233 B1 | 7/2003 | Underwood |
| 6,609,128 B1 | 8/2003 | Underwood |
| 6,615,166 B1 | 9/2003 | Guheen et al. |
| 6,633,878 B1 | 10/2003 | Underwood |
| 6,640,248 B1 | 10/2003 | Jorgensen |
| 6,704,873 B1 | 3/2004 | Underwood |
| 6,718,535 B1 | 4/2004 | Underwood |
| 6,721,713 B1 | 4/2004 | Guheen et al. |
| 6,731,625 B1 | 5/2004 | Eastep et al. |
| 6,735,691 B1 | 5/2004 | Capps et al. |
| 6,748,287 B1 | 6/2004 | Hagen et al. |
| 6,754,181 B1 | 6/2004 | Elliott et al. |
| 6,766,314 B2 | 7/2004 | Burnett |
| 6,785,692 B2 | 8/2004 | Wolters et al. |
| 6,826,616 B2 | 11/2004 | Larson et al. |
| 6,839,759 B2 | 1/2005 | Larson et al. |
| 6,850,252 B1 | 2/2005 | Hoffberg |
| 6,856,330 B1 | 2/2005 | Chew et al. |
| 6,870,921 B1 | 3/2005 | Elsey et al. |
| 6,909,708 B1 | 6/2005 | Krishnaswamy et al. |
| 6,944,279 B2 | 9/2005 | Elsey et al. |
| 6,947,992 B1 | 9/2005 | Shachor |
| 6,954,736 B2 | 10/2005 | Menninger et al. |
| 6,957,186 B1 | 10/2005 | Guheen et al. |
| 6,985,922 B1 | 1/2006 | Bashen et al. |
| 7,013,290 B2 | 3/2006 | Ananian |
| 7,039,606 B2 | 5/2006 | Hoffman et al. |
| 7,054,837 B2 | 5/2006 | Hoffman et al. |
| 7,072,843 B2 | 7/2006 | Menninger et al. |
| 7,096,495 B1 | 8/2006 | Warrier et al. |
| 7,100,195 B1 | 8/2006 | Underwood |
| 7,107,285 B2 | 9/2006 | von Kaenel et al. |
| 7,120,596 B2 | 10/2006 | Hoffman et al. |
| 7,145,898 B1 | 12/2006 | Elliott |
| 7,149,698 B2 | 12/2006 | Guheen et al. |
| 7,149,803 B2 | 12/2006 | Douglis et al. |
| 7,160,599 B2 | 1/2007 | Hartman |
| 7,165,041 B1 | 1/2007 | Guheen et al. |
| 7,171,379 B2 | 1/2007 | Menninger et al. |
| 7,188,138 B1 | 3/2007 | Schneider |
| 7,188,180 B2 | 3/2007 | Larson et al. |
| 7,194,552 B1 | 3/2007 | Schneider |
| 7,331,061 B1 | 2/2008 | Ramsey et al. |
| 7,353,533 B2 | 4/2008 | Wright et al. |
| 7,363,347 B2 | 4/2008 | Thomas |
| 7,386,889 B2 | 6/2008 | Shay |
| 7,398,552 B2 | 7/2008 | Pardee et al. |
| 7,430,760 B2 | 9/2008 | Townsend et al. |
| 7,509,687 B2 | 3/2009 | Ofek et al. |
| 7,519,986 B2 | 4/2009 | Singhal |
| 7,567,510 B2 | 7/2009 | Gai et al. |
| 7,596,803 B1 | 9/2009 | Barto et al. |
| 7,637,147 B2 | 12/2009 | Lee et al. |
| 7,644,434 B2 | 1/2010 | Pollutro et al. |
| 7,660,902 B2 | 2/2010 | Graham et al. |
| 7,660,980 B2 | 2/2010 | Shay et al. |
| 7,770,223 B2 | 8/2010 | Shevenell et al. |
| 8,412,838 B1 * | 4/2013 | Wang et al. ............... 709/229 |
| 2001/0020195 A1 | 9/2001 | Patel et al. |
| 2001/0052012 A1 | 12/2001 | Rinne et al. |
| 2001/0054044 A1 | 12/2001 | Liu et al. |
| 2001/0054147 A1 | 12/2001 | Richards |
| 2002/0002577 A1 | 1/2002 | Garg et al. |
| 2002/0022969 A1 | 2/2002 | Berg et al. |
| 2002/0029086 A1 | 3/2002 | Ogushi et al. |
| 2002/0062367 A1 | 5/2002 | Debber et al. |
| 2002/0077981 A1 | 6/2002 | Takatori et al. |
| 2002/0078015 A1 | 6/2002 | Ponnekanti |
| 2002/0080822 A1 | 6/2002 | Brown et al. |
| 2002/0083183 A1 | 6/2002 | Pujare et al. |
| 2002/0116643 A1 | 8/2002 | Raanan et al. |
| 2002/0133723 A1 | 9/2002 | Tait |
| 2002/0146026 A1 | 10/2002 | Unitt et al. |
| 2002/0146129 A1 | 10/2002 | Kaplan |
| 2002/0184224 A1 | 12/2002 | Haff et al. |
| 2002/0193966 A1 | 12/2002 | Buote et al. |
| 2003/0005118 A1 | 1/2003 | Williams |
| 2003/0005300 A1 | 1/2003 | Noble et al. |
| 2003/0009538 A1 | 1/2003 | Shah et al. |
| 2003/0023726 A1 | 1/2003 | Rice et al. |
| 2003/0033545 A1 | 2/2003 | Wenisch et al. |
| 2003/0055962 A1 | 3/2003 | Freund et al. |
| 2003/0063750 A1 | 4/2003 | Medvinsky et al. |
| 2003/0083991 A1 | 5/2003 | Kikinis |
| 2003/0084350 A1 | 5/2003 | Eibach et al. |
| 2003/0171885 A1 | 9/2003 | Coss et al. |
| 2003/0179900 A1 | 9/2003 | Tian et al. |
| 2003/0200439 A1 | 10/2003 | Moskowitz |
| 2003/0208448 A1 | 11/2003 | Perry et al. |
| 2003/0208562 A1 | 11/2003 | Hauck et al. |
| 2003/0217126 A1 | 11/2003 | Polcha et al. |
| 2003/0217166 A1 | 11/2003 | Dal Canto et al. |
| 2003/0220768 A1 | 11/2003 | Perry et al. |
| 2003/0220821 A1 | 11/2003 | Walter et al. |
| 2004/0006710 A1 | 1/2004 | Pollutro et al. |
| 2004/0022191 A1 | 2/2004 | Bernet et al. |
| 2004/0024764 A1 | 2/2004 | Hsu et al. |
| 2004/0031058 A1 | 2/2004 | Reisman |
| 2004/0049515 A1 | 3/2004 | Haff et al. |
| 2004/0107342 A1 | 6/2004 | Pham et al. |
| 2004/0107360 A1 | 6/2004 | Herrmann et al. |
| 2004/0111410 A1 | 6/2004 | Burgoon et al. |
| 2004/0142686 A1 | 7/2004 | Kirkup et al. |
| 2004/0193606 A1 * | 9/2004 | Arai et al. ............... 707/9 |
| 2004/0193912 A1 * | 9/2004 | Li et al. ............... 713/200 |
| 2004/0214576 A1 | 10/2004 | Myers et al. |
| 2004/0228362 A1 | 11/2004 | Maki et al. |
| 2004/0230797 A1 | 11/2004 | Ofek et al. |
| 2005/0015624 A1 | 1/2005 | Ginter et al. |
| 2005/0027788 A1 | 2/2005 | Koopmans et al. |
| 2005/0038779 A1 | 2/2005 | Fernandez et al. |
| 2005/0132030 A1 | 6/2005 | Hopen et al. |
| 2005/0185647 A1 | 8/2005 | Rao et al. |
| 2005/0265351 A1 | 12/2005 | Smith et al. |
| 2005/0283822 A1 * | 12/2005 | Appleby et al. ............... 726/1 |
| 2006/0005240 A1 | 1/2006 | Sundarrajan et al. |
| 2006/0068755 A1 | 3/2006 | Shraim et al. |
| 2006/0075464 A1 | 4/2006 | Golan et al. |
| 2006/0080441 A1 | 4/2006 | Chen et al. |
| 2006/0080667 A1 | 4/2006 | Sanghvi et al. |
| 2006/0090196 A1 * | 4/2006 | van Bemmel et al. ............... 726/4 |
| 2006/0198394 A1 * | 9/2006 | Gotoh et al. ............... 370/469 |
| 2006/0218273 A1 * | 9/2006 | Melvin ............... 709/224 |
| 2006/0245414 A1 | 11/2006 | Susai et al. |
| 2006/0248480 A1 | 11/2006 | Faraday et al. |
| 2006/0271652 A1 | 11/2006 | Stavrakos et al. |
| 2006/0274760 A1 * | 12/2006 | Srinivasan et al. ............... 370/420 |
| 2006/0277275 A1 | 12/2006 | Glaenzer |
| 2006/0277591 A1 * | 12/2006 | Arnold et al. ............... 726/1 |
| 2006/0282545 A1 | 12/2006 | Arwe et al. |
| 2006/0282876 A1 | 12/2006 | Shelest et al. |
| 2007/0038618 A1 | 2/2007 | Kosciusko et al. |
| 2007/0061434 A1 | 3/2007 | Schmieder et al. |
| 2007/0113269 A1 | 5/2007 | Zhang |

| | | | |
|---|---|---|---|
| 2007/0136317 | A1 | 6/2007 | Przywara |
| 2007/0192853 | A1 | 8/2007 | Shraim et al. |
| 2007/0271592 | A1* | 11/2007 | Noda et al. .................. 726/1 |
| 2007/0283014 | A1 | 12/2007 | Shinomiya et al. |
| 2007/0294762 | A1 | 12/2007 | Shraim et al. |
| 2007/0299915 | A1 | 12/2007 | Shraim et al. |
| 2008/0005779 | A1* | 1/2008 | Takenaka et al. ............ 726/1 |
| 2008/0008202 | A1* | 1/2008 | Terrell et al. ............... 370/401 |
| 2008/0215889 | A1 | 9/2008 | Celik et al. |
| 2009/0158384 | A1 | 6/2009 | Kanade et al. |
| 2009/0210364 | A1 | 8/2009 | Adi et al. |
| 2010/0037284 | A1 | 2/2010 | Sachs |
| 2010/0223222 | A1* | 9/2010 | Zhou et al. ................... 706/47 |
| 2010/0235879 | A1 | 9/2010 | Burnside et al. |
| 2011/0280215 | A1* | 11/2011 | Nakagawa et al. ............ 370/331 |
| 2012/0051529 | A1* | 3/2012 | Dobbins et al. .......... 379/142.06 |
| 2012/0096513 | A1* | 4/2012 | Raleigh et al. ................ 726/1 |
| 2012/0304277 | A1* | 11/2012 | Li et al. ........................ 726/12 |

FOREIGN PATENT DOCUMENTS

| | | |
|---|---|---|
| EP | 1 418 730 | 5/2004 |
| EP | 1 641 215 | 3/2006 |
| WO | WO-01/33759 | 5/2001 |
| WO | WO-01/38995 | 5/2001 |
| WO | WO-02/079949 | 10/2002 |
| WO | WO-2005/066737 | 7/2005 |

OTHER PUBLICATIONS

Darryle Merlette, Dr. Parag Pruthi; Network Security; *NetDetector: Identifying Real Threats and Securing Your Network;* Copyright © 2003 NIKSUN, Inc., Monmouth Junction NJ, USA.

Darryle Merlette; Spencer Parker, Dr. Parag Pruthi; NIKSUN Network Security; *NetDetector: Monitoring and Minimizing Instant Messaging Risks;* Copyright © 2003 NIKSUN, Inc., Monmouth Junction NJ, USA.

Aleksander Svelokken, "Biometric Authentication and Identification Using Keystroke Dynamics With Alert Levels", Master Thesis (Retrieved from University of Oslo), May 23, 2007, pp. 1-124.

International Search Report for PCT Application No. PCT/US2004/043405; Completed Mar. 15, 2005; Mailed Mar. 23, 2005.
Written Opinion of the International Search Authority for PCT Application No. PCT/US2004/043405; Completed Mar. 15, 2005; Mailed Mar. 23, 2005.
Office Action for JP Application No. 2006-547397 dated Jul. 5, 2011.
Office Action for JP Application No. 2006-547397 dated Nov. 30, 2010.
Office Action for U.S. Appl. No. 10/423,444 dated Jun. 13, 2006.
Office Action for U.S. Appl. No. 10/423,444 dated Mar. 12, 2007.
Office Action for U.S. Appl. No. 10/423,444 dated Sep. 7, 2007.
Office Action for U.S. Appl. No. 10/423,444 dated Mar. 14, 2008.
Office Action for U.S. Appl. No. 10/423,444 dated Sep. 19, 2008.
Office Action for U.S. Appl. No. 10/423,444 dated Feb. 25, 2009.
Office Action for U.S. Appl. No. 10/423,444 dated Jul. 27, 2009.
Notice of Allowance for U.S. Appl. No. 10/423,444 dated Nov. 16, 2009.
Office Action for U.S. Appl. No. 12/163,292 dated Aug. 8, 2011.
Office Action for U.S. Appl. No. 10/583,578 dated Jun. 24, 2010.
Office Action for U.S. Appl. No. 10/583,578 dated Feb. 11, 2011.
Office Action for U.S. Appl. No. 10/583,578 dated Jul. 19, 2011.
Office Action for U.S. Appl. No. 12/270,278 dated Jun. 24, 2011.
Office Action for U.S. Appl. No. 12/406,613 dated Oct. 24, 2011.
International Search Report for International Application No. PCT/US2008/007984; Completed Aug. 22, 2009; Mailed Sep. 3, 2009.
Notice of Allowance on U.S. Appl. No. 10/583,578 dated Mar. 27, 2012.
Office Action on U.S. Appl. No. 12/163,292 dated Aug. 8, 2011.
Office Action on U.S. Appl. No. 12/267,850 dated Jun. 14, 2012.
Office Action on U.S. Appl. No. 12/270,278 dated Nov. 9, 2011.
Office Action on U.S. Appl. No. 12/406,613 dated Mar. 20, 2012.
Office Action on U.S. Appl. No. 12/432,186 dated Jun. 25, 2012.
Office Action on U.S. Appl. No. 12/267,850 dated Nov. 7, 2012.

* cited by examiner

Host Application Table — 310

| Entry | |
|---|---|
| Entry 1 | IP Address & Port Number & Protocol / Descriptive Application Name |
| Entry 2 | |
| Entry 3 | |
| Entry 4 | |
| Entry 5 | |
| Entry 6 | |
| Entry 7 | |
| Entry 8 | |
| ... | |
| Entry N | |

320 — IP Address & Port Number & Protocol
330
340 — Descriptive Application Name

SYSTEM AND METHOD FOR INFERRING ACCESS POLICIES FROM ACCESS EVENT RECORDS

CROSS REFERENCE TO RELATED APPLICATIONS

This application claims the benefit of U.S. Provisional Application No. 60/986,856, filed Nov. 9, 2007, entitled "System And Method For Inferring Access Policies From Access Event Records", the contents of which are hereby incorporated by reference.

FIELD OF THE INVENTION

This invention relates to computer system security and, more particularly, to a system and method for policy creation using access event records.

BACKGROUND OF THE INVENTION

A secured computer network uses one or more security gateways to limit user access to protected network resources located behind the gateways. System administrators typically manage those gateways through a central gateway administration console.

SUMMARY OF THE INVENTION

The present invention is embodied as a method of reading a record in an event log or a behavior log and automatically inferring a gateway policy based on the record. The method may include reading components of the log record, translating pertinent components into policy attributes, creating a new policy based on those attributes, and presenting the new policy to a system administrator for approval. The system administrator may edit the policy if desired. Approved policies may be stored in the directory server where the security gateways may read and may act on the policies.

The present invention is also embodied as a system for inferring a gateway policy based on a log record. The system may include an audit for retrieving at least one respective log record; a policy inference logic module for automatically creating a policy based on the retrieved log record and predetermined policy attributes; and a policy module for presenting the created policy for approval and for communicating the approved policy.

When inferring a policy from a log record the method may read appropriate log components such as IP addresses, may look them up in local servers to retrieve descriptive names appropriate for policy attributes, then may present the descriptive names in the inferred policy.

BRIEF DESCRIPTION OF THE DRAWINGS

The invention is best understood from the following detailed description when read in connection with the accompanying drawings. According to common practice, various features/elements of the drawings may not be drawn to scale. Common numerical references represent like features/elements. The following figures are included in the drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The gateways may report access activity that includes successful and unsuccessful user attempts to use protected network resources. Each gateway may report such activities as event logs that include a record of each access attempt.

The gateways may send the event logs to a centralized log server that parses the event logs and archives event information in a database or table (e.g., a relational database). The log server may use the event logs to generate (infer) behavior logs in the database. The behavior logs may include a summary of resource usage patterns from the event logs.

A system administrator (SA) may use an administration console to specify access through each managed gateway. That is, the administration console may maintain a set of policies that define access rules for protected network resources behind (protected by) the managed gateways. Each policy may specify: (1) an entity allowed or denied access (such as a user or a user group); (2) a requested resource (a web server, for example); (3) the gateway through which access occurs; (4) the authentication type, and the effective dates and times for the policy, among others. A policy's scope may cover a single entity, a set of entities, or all entities.

The SA may create each policy that the gateways enforce. SA may define each policy attribute to create adaptive access rules. The SA may create liberal policies when the gateways are first installed inline along the data path and when network resources are first protected by the gateways. The SA may create needs-based and role-based policies after the system is in-place by examining the reports generated through the administration console. These reports may be based on logs maintained by a log server. The SA may note when desired access is denied and when undesired access is granted. The SA may refine policies to adjust access appropriately. The administration console may store each policy on a directory server such that the gateways may read the policies and enforce them.

Creating policies based on log entries may require considerable time and effort. The SA may examine one or more logs, analyze each entry for access problems, correlate scattered events, and—if the SA finds problems—he may manually create one or more policies using the administration console to put them into effect.

Policy creation may be complicated because event logs typically display raw and temporal event data using distinguished names that are not always easily readable by the SA. An event log may define a protected network resource, for example, by listing its IP address and port number (e.g., a distinguished name), while the SA understands (recognizes) the protected resource by a descriptive name such as "engineering web server" that the SA defined in the system and uses when working with that resource. The SA may, for example, look up the IP address/port number to cross reference the descriptive name. Such a task is complicated, especially if there are numerous protected network resources in the secure network.

Figure 1:
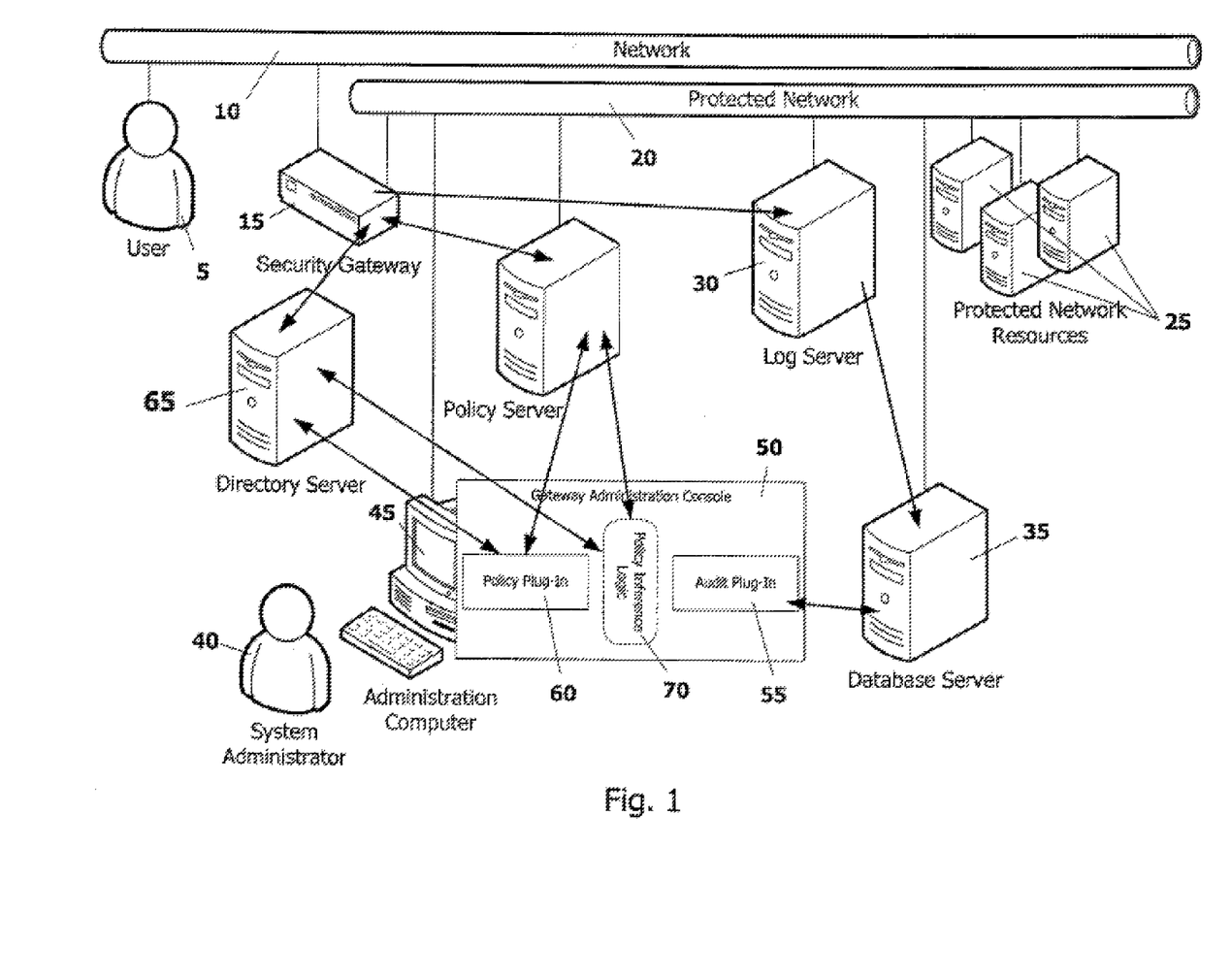
FIG. 1 is a schematic diagram illustrating an exemplary network with a security gateway administration in accordance with various exemplary embodiments of the invention.

FIG. 1 is a schematic diagram illustrating an exemplary network with a security gateway administration in accordance with various exemplary embodiments of the invention.

In FIG. 1, security gateway administration may include security gateway 15, directory server 65, log server 30, database server 35, administration computer 45 and gateway administrations console 50. Portions of the security gateway administration may exchange data over their network connections.

In FIG. 1, user 5 may be connected via network 10 to security gateway 15. The gateway 15 stands between user 5 and other outside entities that may desire to connect to network elements 25, 30, 35, 45 and 65 located on protected network 20. The gateway 15 may monitor data flow between entities outside protected network 20 and elements 25, 30, 35, 45 and 65 within the protected network. The gateway 15 may determine which entities, such as user 5, may or may not access protected network resources 25.

Figure 2:
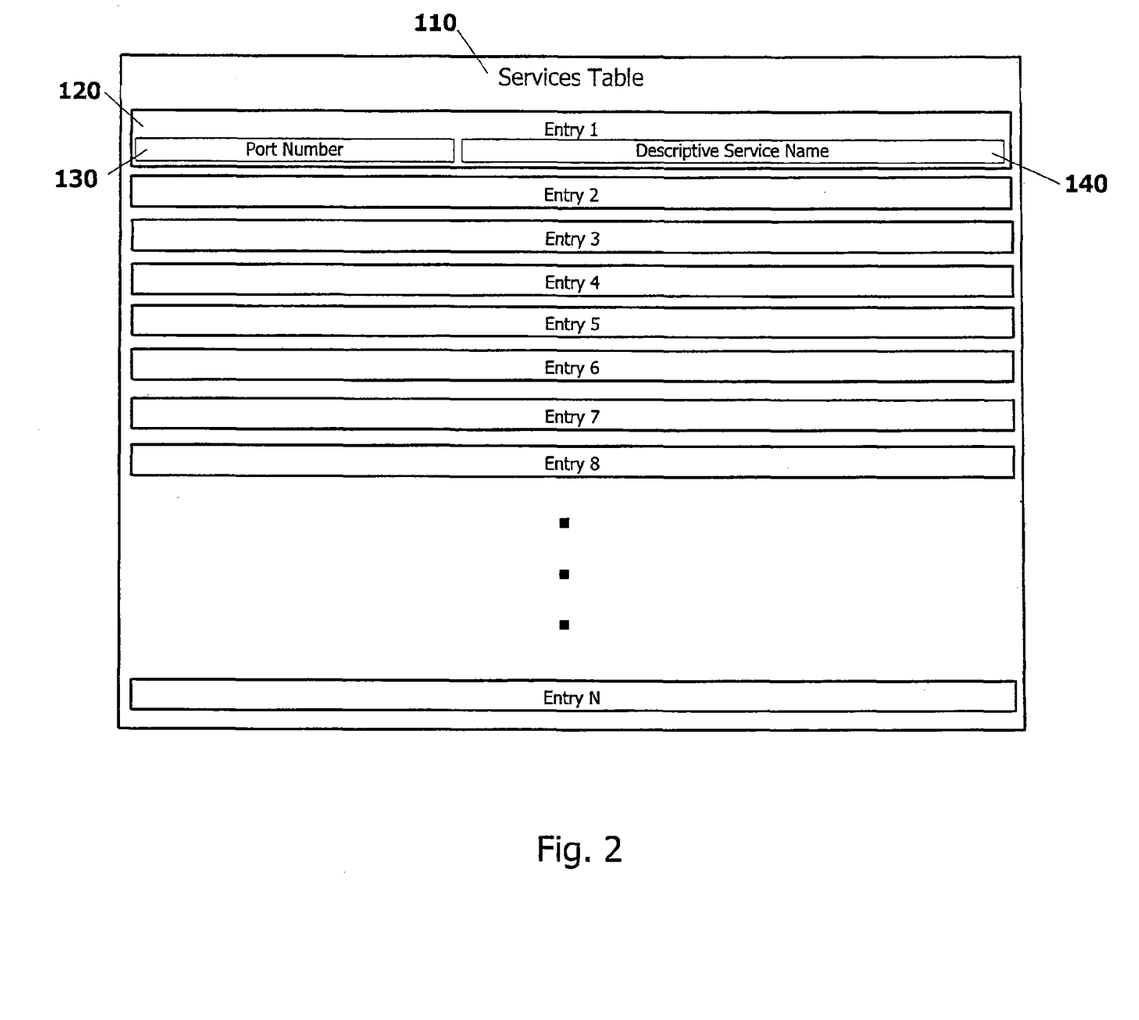
FIG. 2 is a block diagram illustrating a services table used with the security gateway administration of FIG. 1 to store descriptive service names associated with port numbers.

FIG. 2 is a block diagram illustrating a services table used with the security gateway administration of FIG. 1 to store descriptive service names associated with port numbers.

Policies may determine rules of access. Policies may be stored in directory server 65 where gateway 15 may read them. Although a single security gateway is shown, it is contemplated that multiple gateways may protect (limit) access to one or more protected networks.

The security gateway 15 may send to log server 30 records of successful and unsuccessful access attempts to access protected network 20. The log server may store a gateway's records in an event log. The log server 30 may use one or more event logs to summarize resource usage and store the summary in one or more behavior logs. The log server 30 may store the event logs and/or the behavior logs in a database server 35 where other network entities may access the event and/or behavior logs.

Although separate servers are shown for the directory, log and database servers, it is contemplated that some or all of these servers may be combined.

One or more SAs 40 may manage security gateway 15 through gateway administration console 50. The gateway administration console may include a program that runs on administration computer 45, which may be any computer for which the SA has access to directory server 65 and database server 35.

The gateway administration console 50 may include a plurality of plug-ins that handle different functions of gateway management. An ID audit plug-in 55 may retrieve event and behavior logs from database server 35 so SA 40 may view them. An ID policy plug-in 60 may store policies in directory server 65, may read policies from directory server 65, and may allow the SA to create, edit, and/or manage policies.

In certain exemplary embodiments, policy inference logic 70 may be included in gateway administration console 50. Policy inference logic may work with ID audit plug-in 55 and ID policy plug-in 60 to create new policies by inferring policy attributes from the event and behavior log records. The policy inference logic may automatically look up entries in the directory server 65 to find (cross-reference) descriptive and distinguished names for values in particular log records.

FIG. 2 is a block diagram illustrating a services table used with the security gateway administration of FIG. 1 to store descriptive service names associated with port numbers.

Services table 110 may store a set of entries 120. Each entry 120 may associate port number 130 with a descriptive service name 140 of a service offered, for example, within protected network resources (25).

Services table 110 may be stored in directory server 65 which is accessible by gateway administration console 50. One or more SA 40 may create and may maintain services table 110, manually and/or through automated processes, and may assign descriptive service names 140 that assist SAs 40 to recognize the resources corresponding to particular port numbers 130. As one example, port 777 may be described by the service name "Debugging Service."

Figure 3:
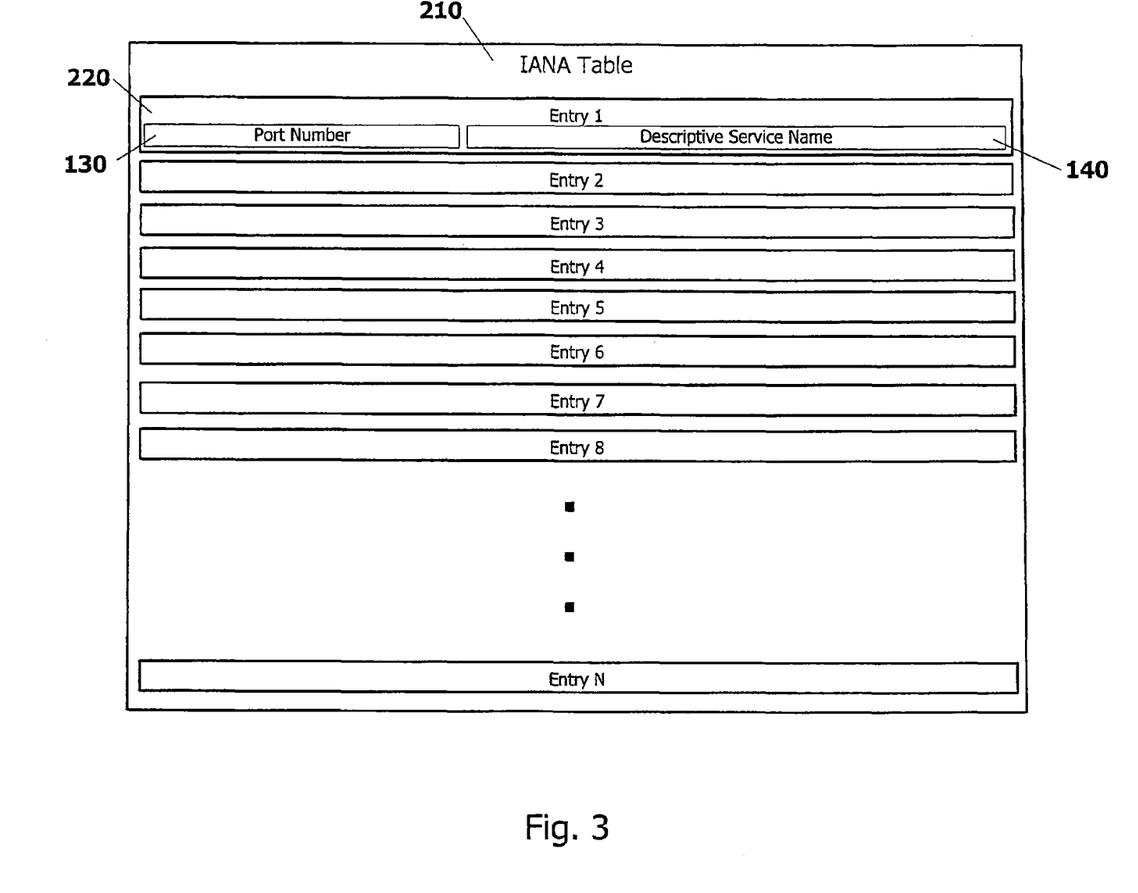
FIG. 3 is a block diagram illustrating an IANA table used with the security gateway administration of FIG. 1 to store descriptive service names associated with port numbers.

FIG. 3 is a block diagram illustrating an IANA table used with the security gateway administration of FIG. 1 to store descriptive service names associated with port numbers.

An IANA (Internet Assigned Numbers Authority) table 210 may store a set of entries 220. Each entry 220 may associate a port number 130 with a descriptive service name 140 of a service offered within, for example, protected network resources 25.

The IANA table 210 may be stored internally in memory where it is accessible by gateway administration console 50. The port numbers 130 and associated descriptive service names 140 refer generally to those defined by the Internet Assigned Numbers Authority. For example, port number 80 may be associated with an HTTP service.

Figure 4:
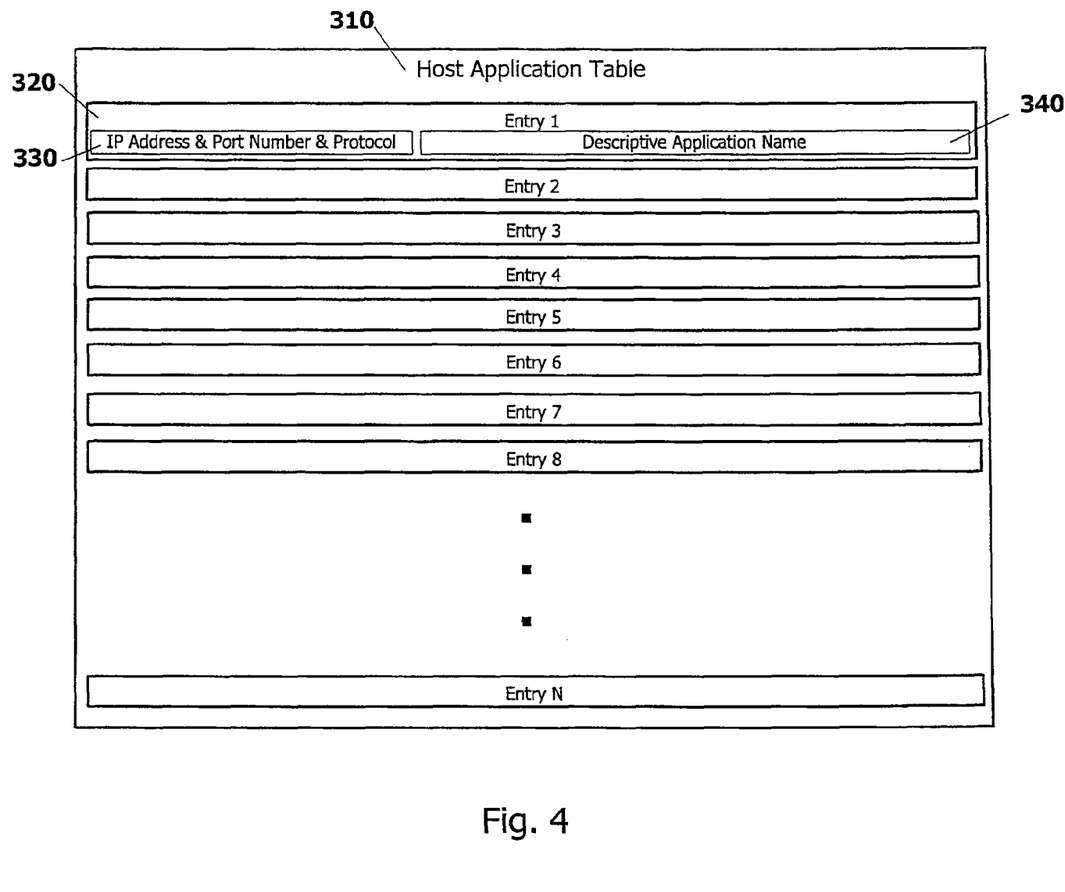
FIG. 4 is a block diagram illustrating a host application table used with the security gateway administration of FIG. 1 to store descriptive application names associated with IP addresses, port numbers and protocols.

FIG. 4 is a block diagram illustrating a host application table used with the security gateway administration of FIG. 1 to store descriptive application names associated with IP addresses, port numbers, and protocols.

Host application table 310 may store a set of entries 320. Each entry 320 may associate an IP address, port number, and protocol 330 with a descriptive application name 340 of an application that may supply services within, for example, protected network resources 25.

The host application table 310 may be stored in database server 35 which is accessible by gateway administration console 50. One or more SAs 40 may create and maintain host application table 310, assigning descriptive application names 340 that assist SAs 40 to understand (recognize) which particular applications are defined by, for example, which respective IP addresses, port numbers, and protocols 330 and the operation served by the particular applications. As one example, the IP address 196.25.1.214, port number 80, and protocol HTTP may be described by the service name "Engineering Wiki Server."

Although services table 110, IANA table 210 and host application table 310 are shown separately, these tables may be combined in any matter so long as the information in these tables is viewable by the SAs during policy creation.

Although services table 110, IANA table 210 and host application table 310 are disclosed as being stored on directory server 65, they may be stored on any number of different network resources as long as those network resources are secure and accessible (viewable) by the SAs.

Figure 5:
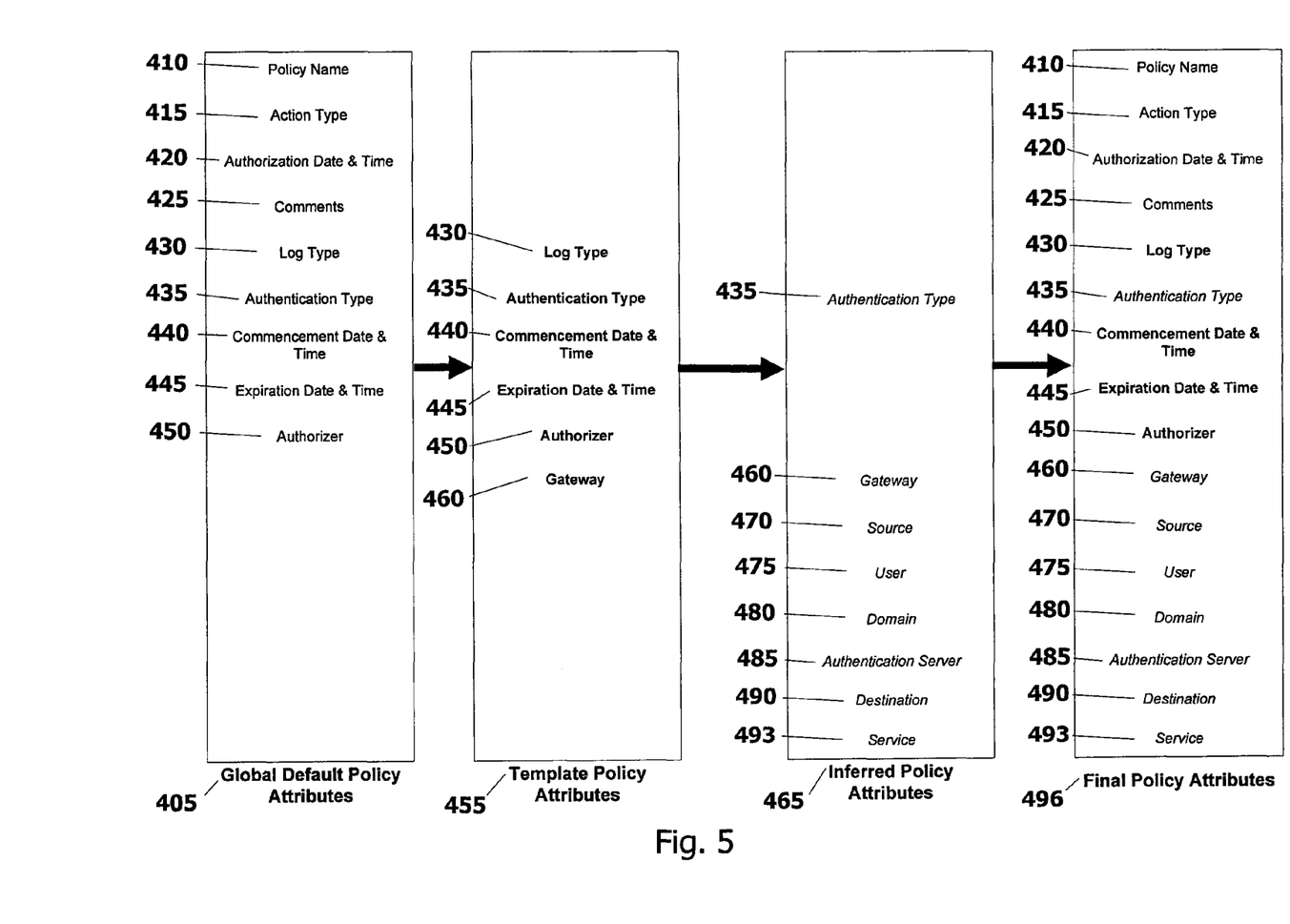
FIG. 5 is a flow chart illustrating attributes used to generate exemplary inferred policies in accordance with various exemplary embodiments of the invention.

FIG. 5 is a flow chart illustrating attributes used to generate exemplary inferred policies in accordance with various exemplary embodiments of the invention.

Now referring to FIG. 5, a plurality of attributes may be used to generate an inferred policy. In certain exemplary embodiments, these attributes may include one or more of: (1) global default policy attributes; (2) template policy attributes; (3) inferred policy attributes and/or (4) final policy attributes. SA 40 may use event information, log information and/or behavioral log information to infer new policies. Global default policy attributes 405 may have values that are assigned in gateway administration console 50 and may be stored where they are accessible to console 50. In certain exemplary embodiments, these attribute values may be used to set attributes for a new policy whenever SA 40 causes a policy to be inferred from a log entry.

Global default policy attributes may include the following attributes: (1) policy name 410 that may provide a unique identifying name for the policy and may be typically set to empty so SA 40 may enter a value when the inferred policy is initially presented; (2) action type 415 that may define how the policy's rules are applied; (3) authorization date and time 420 that may specify when the policy is placed into effect; (4) comments 425 that are optional text for describing the policy; (5) log type 430 that may specify a type of log used to infer the policy; (6) authentication type 435 that may define a type of authentication used for access; (7) commencement date and time 440 that may define when the policy takes effect; (8) expiration date and time 445 that may define when the policy expires and no longer has any effect; and (9) authorizer 450 that may be a name of the person (a supervisor or manager, for example) who instituted creation of the policy.

The action type may not be specified by default. The SA 40 may specify a value for action type of, for example, "accept," "deny," or "reject" when inferring a new policy from a log entry. Authorization date and time may be set by default to be the current date and time when the policy is inferred. Comments may be set by default to empty so that SA 40 may fill them in as desired. Log type may be set by default, for example, to accounting or otherwise may be set to use event or behavioral logs.

Authentication type may be set by default to any type of authorized type of authentication, for example, smartcard, writing sample, password and/or biometric authentication. Commencement date and time may be, for example, set by default to the current date and time or manually set to a predetermined date and time. Expiration date and time may be set by default to the current date and time or manually set to a predetermined date and time. Authorizer 450 may be set by default to the name of SA 40 currently logged into gateway administration console 50.

Template policy attributes 455 may have values that are stored in a policy template. Each SA 40 may use gateway administration console 50 and may have a policy template individually assigned that includes policy attribute values that the respective SA 40 desires when creating or editing the policy template. The policy template may be stored where it is accessible by gateway administration console 50.

Template policy attribute 455 values, if present, may override values for attributes of the same name set by global default policy attributes 405. The security gateway administration may search for the policy template having the template policy attributes for the SA 40 logged onto gateway administration console 50 or requesting the policy. If a policy template is found, it may use any attribute values in the policy template to override attribute values of the same name from the global policy attributes 405 for the new policy.

Template policy attributes 455 may include the following attributes previously described: log type 430, authentication type 435, commencement date and time 440, expiration date and time 445, and authorizer 450. They may also include gateway 460, which is the descriptive name of the gateway through which an access request may be authorized.

Inferred policy attributes 465 may have attribute values that may be determined after a new policy is assigned values for global default policy attributes 405 and template policy attributes 455. The currently selected log entry may be used to determine these attribute values.

Inferred policy attributes 465 may include the following attributes: (1) authentication type 435; (2) gateway 460; (3) source 470 that may include the IP address and/or the descriptive name of the network location from which the access request may be authorized; (4) user 475 that may include the distinguished name of the user requesting the resource; (5) domain 480 that may include the name of the domain from which the access request may be authorized; (6) authentication server 485 that includes the name of the server that authenticated the user making the access request; (7) destination 490 that includes the IP address and/or the descriptive name of the requested protected network service; (8) service 493 that may include the descriptive name of the service provided by the requested network resource.

Values for the authentication type and/or gateway, if present in the current log entry, may be used to override previously assigned values from global default policy attributes 405 and/or template policy attributes 455. The descriptive names of the gateway, source and/or destination attributes, if they exist, may be retrieved from directory server 65 and the distinguished names of the user may be verified through directory server 65. The descriptive name of the service attribute, if one exists, may come from either services table 110 or IANA table 210.

The final policy attributes 496 may be a combination of the attributes defined by global default policy attributes 405, the template policy attributes and inferred policy attributes 465. In certain exemplary embodiments, their values may include global default policy attribute values overridden by any defined template policy attribute values and augmented and overridden by any inferred policy attribute values, respectively. In other exemplary embodiments, one or more of the policy attributes 405, 455 and/or 465 may be eliminated and the remaining attributes may be used to generate final policy attributes 496.

Figure 6A:
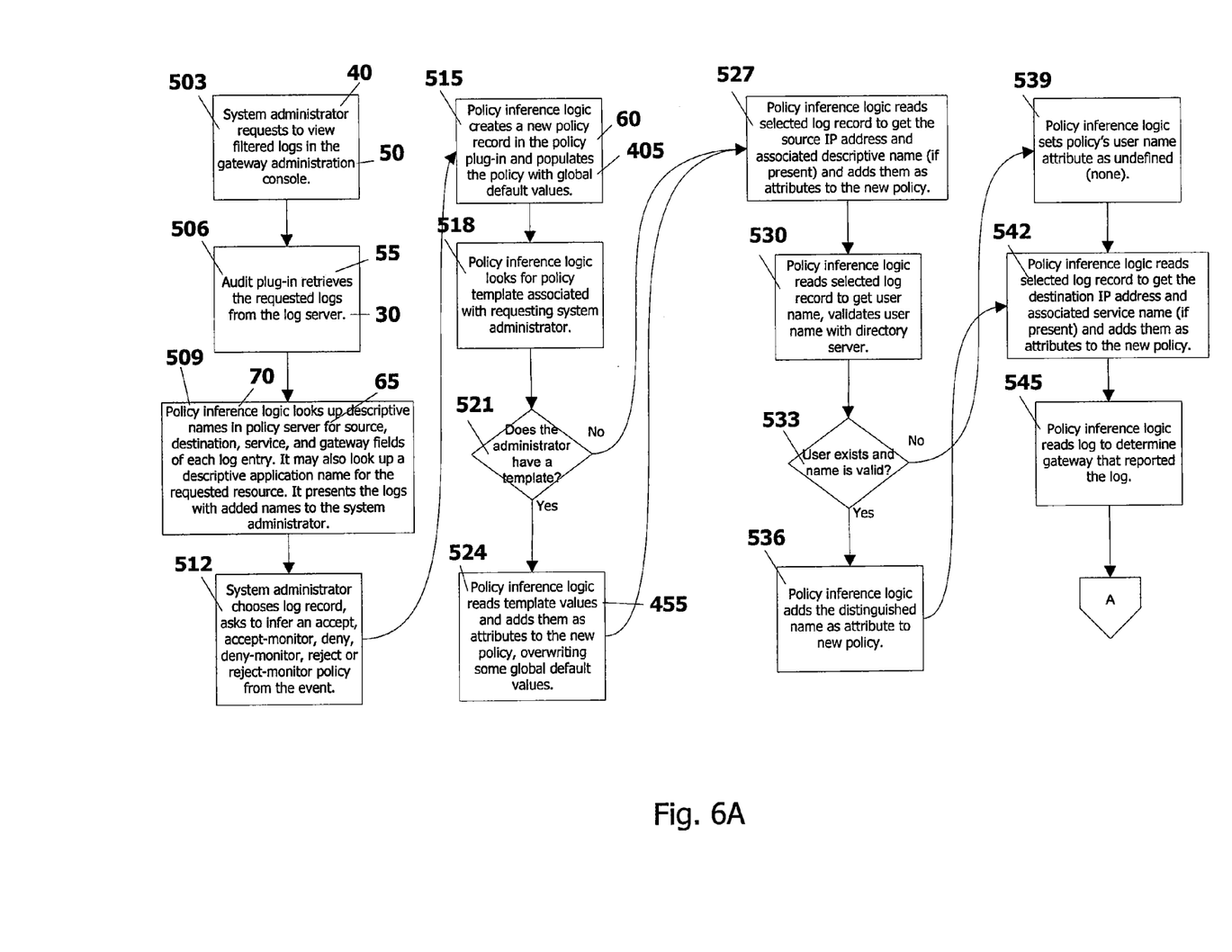
FIGS. 6A and 6B are flow charts illustrating a method of generating an inferred policy in accordance with an exemplary embodiment of the invention.
Figure 6B:
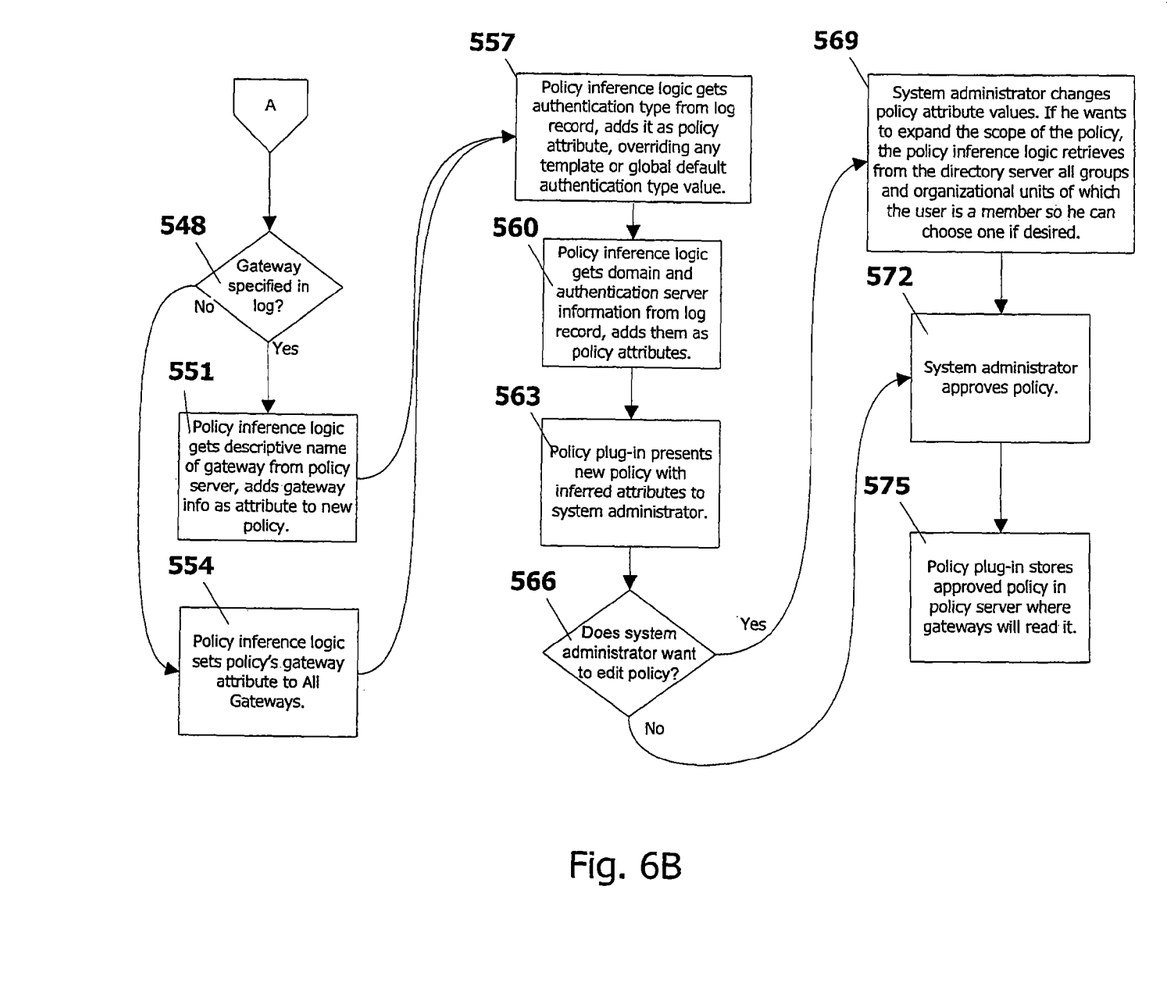

FIGS. 6A and 6B are flow charts illustrating a method of generating an inferred policy in accordance with an exemplary embodiment of the invention.

Now referring to FIGS. 6A and 6B, at step 503, SA 40 may request to view events (e.g., filtered events) or behavior logs in gateway administration console 50. At step 506, ID audit plug-in component 55 of console 50 may retrieve the requested logs from log server 30.

At step 509, policy inference logic 70 of console 50 may read the values of fields in each log record and may contact directory server 65 to locate descriptive names for respective values if the descriptive names exist. The policy inference logic 70 may search for descriptive names for certain fields. These fields may include source, destination, service, and gateway fields. The policy inference logic 70 may also look up a descriptive application name for the requested resource in the log record. The policy inference logic may present the log record to the SA 40 for viewing. The log records may automatically display the descriptive names where they are available and may be updated with the descriptive names.

At step 512, SA 40 may choose a log record and may request to infer a policy from the particular log record. The SA may choose the policy type, for example, an accept policy, a deny policy, or a reject policy. At step 515, policy inference logic 70 may respond by creating a new policy record in ID policy plug-in 60. The new policy may be populated with a set of attributes set by global default policy attributes 405 and having values based on global default attribute values.

At step 518, policy inference logic 70 may search for a policy template that is associated with the respective SA 40 requesting the inferred policy. At step 521, it is determined whether a template policy attribute 455 exists for SA 40. If so, at step 524, policy inference logic 70 may read template policy attribute values from the particular SA's template policy attributes 455 and may add those values as new attributes to the new policy. If the template policy attribute values correspond to attributes that are already defined in the new policy from global default policy attributes 405, the template policy attribute values may override the global default policy attribute values.

At step 527, if the particular SA's template policy attributes have been applied or if a template policy attribute does not exist for the particular SA 40, policy inference logic 70 may select a log record and may read the selected log record to retrieve information about a source of the request in the selected log record. The information may include the source IP address and, if it exists, an associated descriptive name for the source. The policy inference logic 70 may add the IP address and, optionally, the descriptive name as attributes to the new policy.

At step 530, policy inference logic 70 may read the selected log record to retrieve the user name of the entity who requested access, for example, as the user name to be authorized by the new policy. At step 533, policy inference logic 70 may contact directory server 65 to validate the user name and ensure that the user account exists. At step 536, if the user exists and the user name is valid, policy inference logic 70 may add the distinguished name (e.g., a reference to an entity in the directory server for the user) as an attribute to the new policy. At step 539, if the user does not exist or the user name is not validated by directory server 65, policy inference logic 70 may set the policy's user name attribute to undefined (e.g., none). It is noted that SA 40 may then provide the user name attribute at step 569, if the user name attribute is set to undefined.

At step 542, policy inference logic 70 may read the selected log record to retrieve the destination IP address and (if it exists) an associated descriptive service name and may add them as attributes to the new policy.

At step 545, policy inference logic 70 may read the log record (an event or a behavioral record, among others) to determine a gateway that reported the log record and, at step 548, may determine whether the gateway is specified in the reported log record. At step 551, if the gateway is specified in the log record, policy inference logic 70 may contact directory server 65 to search for a corresponding descriptive name for the gateway and may add a gateway specifier and the descriptive gateway name as attributes to the new policy. At step 554, if the gateway is not specified in the log record, policy inference logic 70 may set the new policy's gateway attribute, for example, to all gateways or may specify a specific gateway or a set of gateways based on other information in the log record (e.g., a predetermined gateway or predetermined gateways between the source and destination addresses).

At step 557, policy inference logic 70 may read the selected log record to retrieve the authentication type and may set the new policy's authentication type attribute to the value retrieved from the log record. The new policy may have an authentication type value that is previously set by template policy attributes 455 or global default policy attributes 405. The log record value may override either of these values.

At step 560, the policy inference logic 70 may read the selected log record to retrieve domain and authentication server information and may set the new policy's domain and authentication server attribute values using that information.

At step 563, ID policy plug-in 60 may present to SA 40 the new policy with each attribute value automatically pre-populated, including, for example, the inferred attribute values. At step 566, SA 40 may determine whether to edit the new policy. At step 569, if SA 40 desires to edit the new policy, policy attribute values may be changed by SA intervention as desired. For example, SA 40 may control policy inference logic 70 to retrieve from directory server 65 some or all of the groups and organizational units of which the user is a member using an automatically generated search filter. SA 40 may choose any one of the returned values, or may choose a different user, group, or organizational unit to infer a new policy. At step 572, SA 40 may approve the new policy without editing or once edited to his/her satisfaction.

At step 575, ID policy plug-in 60 may store the approved policy in directory server 65 where each of the protected network's 20 gateways 15 may read the new policy and may act on it.

Figure 7:
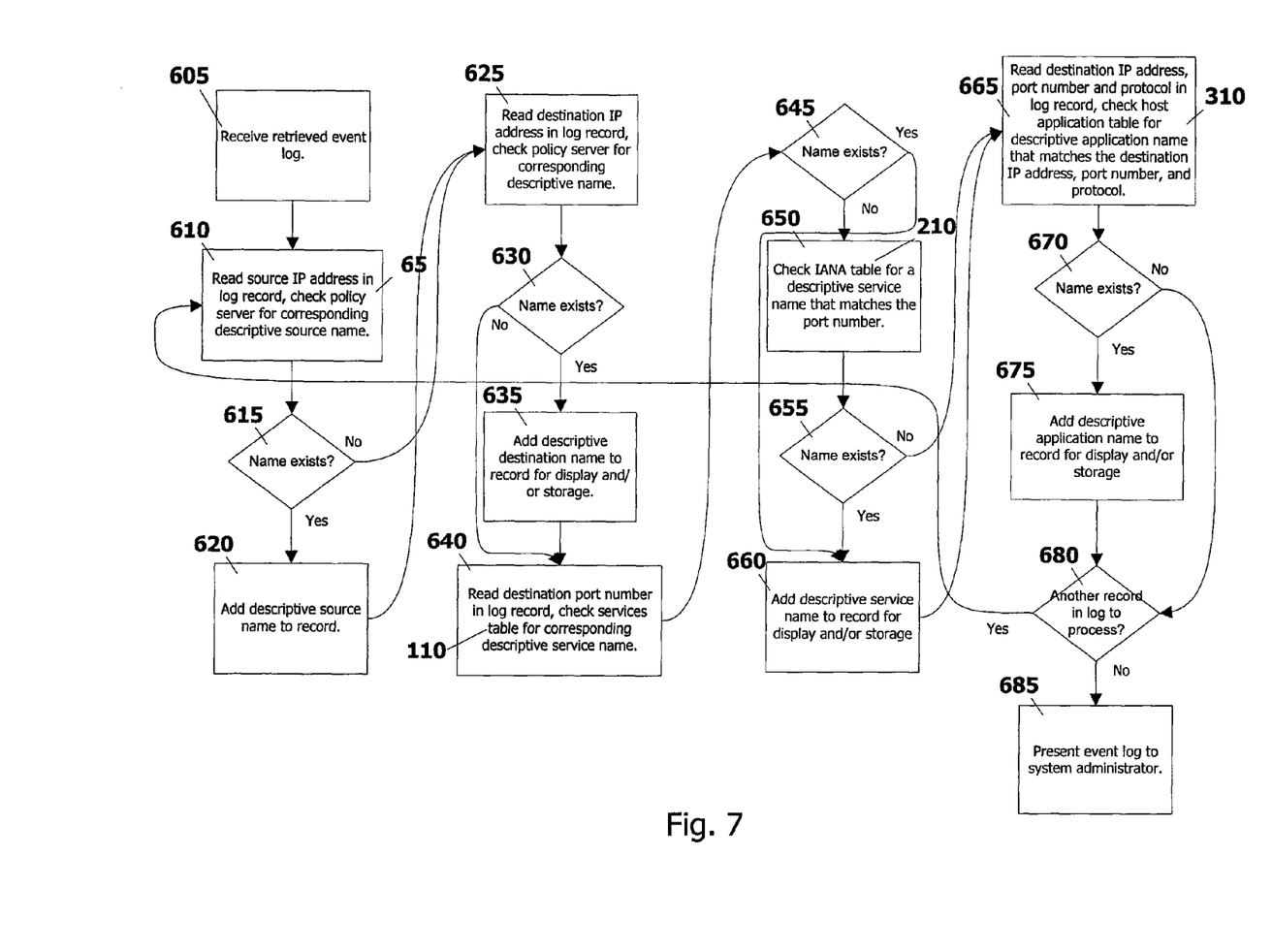
FIG. 7 is a flow chart illustrating a method of finding and displaying descriptive names within an entry log in accordance with another embodiment of the invention.

FIG. 7 is a flow chart illustrating a method of finding and displaying descriptive names within an entry log in accordance with another embodiment of the invention.

Referring now to FIG. 7, at step 605, an event log may be retrieved. At step 610, the source IP address in the log record may be read, then, at step 615, directory server 65 may be contacted to determine if a corresponding descriptive name for the source exists. If the descriptive name does not exist, an indication that no descriptive source name exists may be added to the log record. At step 620, if the descriptive name exists, the descriptive source name may be added to the log record.

At step 625, the destination IP address in the log record may be read, and, at step 630, directory server 65 may be contacted to determine if a corresponding descriptive name for the destination exists. If the descriptive name does not exist, an indication of no descriptive destination name exists may be added to the log record. At step 635, if the descriptive destination name exists, the descriptive destination name may be added to the log record for storage with the log record and/or for display to the SA 40 during policy generation.

At step 640, the destination port number in the log record may be read, then the services table 110 may be checked, at step 645, to determine whether a descriptive service name that corresponds to the port number exist.

At step 650, if the descriptive service name does not exist in services table 110, IANA table 210 may be checked, at step 655, to determine if a descriptive service name that corresponds to the port number exists. At step 660, if the descriptive service name exists in either the services or IANA tables 110 or 210, the descriptive service name may be added to the log record for storage with the log record and/or for display to the SA 40 during policy generation. If the descriptive service name does not exist in services table 110 or the IANA table 210, the descriptive service name is not added to the log record.

At step 665, the destination IP address, port number, and protocol in the log record may be read and the host application table 310 may be checked, at step 670, to determine whether a descriptive application name matches the destination IP address, port number, and protocol listed in the log record. At step 675, if the descriptive application name is listed, the descriptive application name may be added to the log record for storage with the log record and/or for display to the SA 40 during policy generation. If the descriptive application name does not exist in host application table 310, the descriptive application name is not added to the log record.

At step 680, if there is another record in the log to process, the process may return to step 610 to repeat name finding for subsequent records. If the end of the log is reached (e.g., there are no other log record components to process), at step 685, the event or behavioral log may be presented (displayed) for SA 40, who may read the event log with embedded descriptive names.

Although various embodiments of the present invention have been described in terms of creating policies in a network environment, it is not limited thereto. The methods may be carried out, for example, between any number of computers maintaining secure transaction between or among themselves.

The terms log records as used herein is intended to refer to a broad class of transaction type records used for recording secure transactions between processing resources. These records may be transaction, event, summary and/or behavioral log records, among others.

Although several portions of the system are described as plug-ins, it is contemplated that these portions may be standalone software applications or may be a combination of hardware and software.

As described herein, for example, the invention may be embodied in software (e.g., a plug-in or standalone software), in a machine (e.g., a computer system, a microprocessor based appliance, etc.) that includes software in memory, or in a tangible computer storage carrier configured to carry out the policy creation scheme (e.g., in a self contained silicon device, a solid state memory, an optical disc, a magnetic disc, etc.).

Although the invention is illustrated and described herein with reference to specific embodiments, the invention is not intended to be limited to the details shown. Rather, various modifications may be made in the details within the scope and range equivalents of the claims and without departing from the invention.

We claim:

1. A method of establishing a policy for a secure transaction in a network system, the method comprising:
    selecting a log record from among a plurality of log records, the selected log record including log components indicating a transaction log of an attempt to access a protected resource of a network system via a gateway, the attempt reported by the gateway in the log record, the network system including a predefined table with a plurality of records, each record including a distinguished name and a corresponding descriptive name, each distinguished name comprising at least one of: an Internet Protocol (IP) address and a port number of a respective network component, each descriptive name being user-defined to describe the respective network component to a user;
    automatically translating one or more distinguished names in at least one of the log components of the selected log record to one or more corresponding descriptive names, respectively, by cross referencing using the predefined table each respective descriptive name from a corresponding distinguished name in the at least one log component;
    establishing a policy attribute using the translated one or more descriptive names;
    creating a respective policy for the gateway based on the established policy attribute, the policy for controlling access to the protected resource; and
    presenting the policy which includes the translated one or more descriptive names for approval.

2. The method of claim 1, further comprising presenting the policy for approval by displaying the policy on a display device for approval by the user.

3. The method of claim 1, further comprising selecting the log record including the log components indicating the transaction log of the attempt, the attempt comprising a successful or unsuccessful attempt to access the protected resource.

4. The method of claim 3, further comprising editing, responsive to user input, the presented policy prior to approving the presented policy.

5. The method of claim 1, comprising establishing the policy attribute using the translated one or more descriptive names, the one or more descriptive names comprising a descriptive name of at least one of: the protected network resource and a network location from which the policy may authorize access.

6. The method of claim 1, comprising establishing the policy attribute using the translated one or more descriptive names, the one or more descriptive names comprising a descriptive name of the gateway reporting the attempt.

7. The method of claim 1, further comprising identifying the user from the at least one of the log components, and adding a name of the user as a second policy attribute of the policy if the name is validated by a user directory service, the second policy attribute identifying an entity which the policy may authorize access.

8. A method of establishing a policy for a secure transaction in a network system, the network system including network components and a predefined table with a plurality of records, each record including a distinguished name and a corresponding descriptive name, each distinguished name comprising at least one of: an Internet Protocol (IP) address and a port number of a respective network component and each descriptive name being user defined to describe the respective network component to a user, the method comprising:
    selecting a log record from among a plurality of log records, the selected log record including log components indicating a transaction log of an attempt to access a protected resource of a network system via a gateway, the attempt reported by the gateway in the log record;
    translating one or more distinguished names in at least one of the log components to one or more corresponding descriptive names, respectively, by cross referencing using the predefined table each respective descriptive name from a corresponding distinguished name in the at least one log component;
    establishing a log policy attribute using the translated one or more descriptive names;
    creating a respective policy for the gateway based on the established log policy attribute, the policy for controlling access to the protected resource; and
    presenting the policy which includes the translated one or more descriptive names for approval.

9. The method of claim 8, further comprising:
    approving, by an administrator, the presented policy; and
    sending, to a directory server, the approved policy.

10. The method of claim 8, further comprising adding the translated one or more descriptive names to one or both of the retrieved log record or the created policy.

11. The method of claim 8, further comprising choosing the one or more distinguished names for translation based on values of log components in the selected log record, the log components used to choose the one or more distinguished names include one or more of: (1) a source field; (2) a destination field; (3) a service field; or (4) a gateway field.

12. The method of claim 8, further comprising if the corresponding descriptive names do not exist in the table, responsive to user input, controlling an addition of the corresponding descriptive names into the table.

13. The method of claim 8, further comprising:
generating first values associated with default policy attributes;
establishing second values associated with user established policy attributes; and
overriding, by selective ones of the second values associated with user established policy attributes, corresponding ones of the first values associated with the default policy attributes for the user established policy attributes that correspond to the default policy attributes.

14. The method of claim 13, further comprising:
automatically generating at least one third value associated with the log policy attribute;
overriding, by the at least one third value associated with the log policy attribute, a corresponding one of the first values associated with the default policy attributes for the log policy attribute that corresponds to the default policy attributes; and
overriding, by the at least one third value associated with the log policy attribute, a corresponding one of the second values associated with the user established policy attributes for the log policy attribute that corresponds to the user established policy attribute.

15. The method of claim 14, further comprising establishing a plurality of log policy attributes, and if one or more values for the log policy attributes of the respective policy to be created are not applied from or do not exist in the default policy attributes or the user established policy attributes, determining the one or more values from the retrieved log record.

16. An administration device for establishing a policy for a secure transaction using stored log records of a network system, comprising:
an audit module for retrieving at least one respective log record of an attempt to access a protected resource of a network system via a gateway, the attempt reported by the gateway in the log record, the network system including a predefined table with a plurality of records, each record including a distinguished name and a corresponding descriptive name, each distinguished name comprising at least one of: an Internet Protocol (IP) address and a port number of a respective network component, each descriptive name being user-defined to describe the respective network component to a user;
a policy inference logic module for automatically translating one or more distinguished names in the retrieved log record to one or more corresponding descriptive names, respectively, by cross referencing using the predefined table each respective descriptive name from a corresponding distinguished name in the retrieved log record, establishing a policy attribute using the translated one or more descriptive names, and creating a policy for the gateway based on the retrieved log record and the established policy attribute, the policy for controlling access to the protected resource; and
a policy module for presenting the created policy which includes the translated one or more descriptive names for approval and for communicating the approved policy.

17. The device of claim 16, wherein the established policy attribute includes a set of default policy attributes having default values and a set of user established policy attributes having user established values, each of the respective user established policy attributes which correspond to the default policy attributes override the default values with the corresponding user established values.

18. The device of claim 17, wherein if one or more values for the policy attribute of the policy to be created are not applied from or do not exist in the default policy attributes or the user established policy attributes, the policy inference logic determines the one or more values from values in the retrieved log record.

19. The device of claim 17, wherein the policy module presents to an administrator the created policy with each value of the policy attribute automatically pre-populated with one of a default value from the default policy attributes, a user established value from the user established policy attributes or a log attribute value determined from the retrieved log record.

20. The device of claim 16, wherein:
the at least one respective log record includes a plurality of fields with associated values, as distinguished names of resources on the network system; and
the policy inference logic module reads one or more of the distinguished names in the retrieved log record, translates the one or more distinguished names to the one or more descriptive names, respectively, and adds the one or more descriptive names to one or both of the retrieved log record and the created policy.

21. The device of claim 20, wherein the policy inference logic module is configured to communicate with a directory server such that the read distinguished names are cross referenced in a plurality of reference tables of the directory server to obtain the translated descriptive names.

22. The device of claim 20, wherein when the policy inference logic module reads the retrieved log record, the policy inference logic module requests to cross reference the one or more distinguished names to retrieve corresponding descriptive names from one or more reference tables, if the corresponding descriptive names do not exist in the one or more reference tables, the policy inference logic module, responsive to user input, controls an addition of the corresponding descriptive names in the one or more reference tables.

23. The device of claim 16, wherein the administration device maintains the policy which defines access rules for the network, the access rules including: (1) an entity allowed or denied access; (2) one or more resources to which the access is granted; and (3) one or more gateways through which the access is allowed.

24. A non-transitory computer readable storage medium for storing program code to execute the method comprising:
selecting a log record from among a plurality of log records, the selected log record including log components indicating a transaction log of an attempt to access a protected resource of a network system via a gateway, the attempt reported by the gateway in the log record, the network system including a predefined table with a plurality of records, each record including a distinguished name and a corresponding descriptive name, each distinguished name comprising at least one of: an Internet Protocol (IP) address and a port number of a respective network component, each descriptive name being user-defined to describe the respective network component to a user;
automatically translating one or more distinguished names in at least one of the log components of the selected log record to one or more corresponding descriptive names, respectively, by cross referencing using the predefined table each respective descriptive name from a corresponding distinguished name in the at least one log component;

establishing a policy attribute using the translated one or more descriptive names;

creating a respective policy for the gateway based on the established policy attribute, the policy for controlling access to the protected resource; and presenting the policy which includes the translated one or more descriptive names for approval.

* * * * *